BLANKING CIRCUIT FOR A COLOR TELEVISION RECEIVER

Filed March 7, 1967

INVENTORS.
Bernard J. Okey
James G.S. Chua
BY Nicholas D. Amasto
ATTY.

United States Patent Office 3,492,414
Patented Jan. 27, 1970

3,492,414

BLANKING CIRCUIT FOR A COLOR TELEVISION RECEIVER

James G. S. Chua, Roselle, and Bernard J. Okey, Addison, Ill., assignors to Admiral Corporation, Chicago, Ill., a corporation of Delaware Filed Mar. 7, 1967, Ser. No. 621,249
Int. Cl. H04n 5/44
U.S. Cl. 178—5.4 5 Claims

ABSTRACT OF THE DISCLOSURE

A transistor blanking and key clamping circuit for color difference amplifiers employing cathode matrixing. A transistor has its output electrode directly connected to the common cathode terminal, its common electrode connected to ground, and its input terminal coupled to a source of positive horizontal retrace pulses. The DC voltage on the common cathode terminal provides initial operating bias for the output electrode; and the retrace pulses saturate the transistor, thereby applying a negative pulse to the common cathode terminal.

Figure 1:
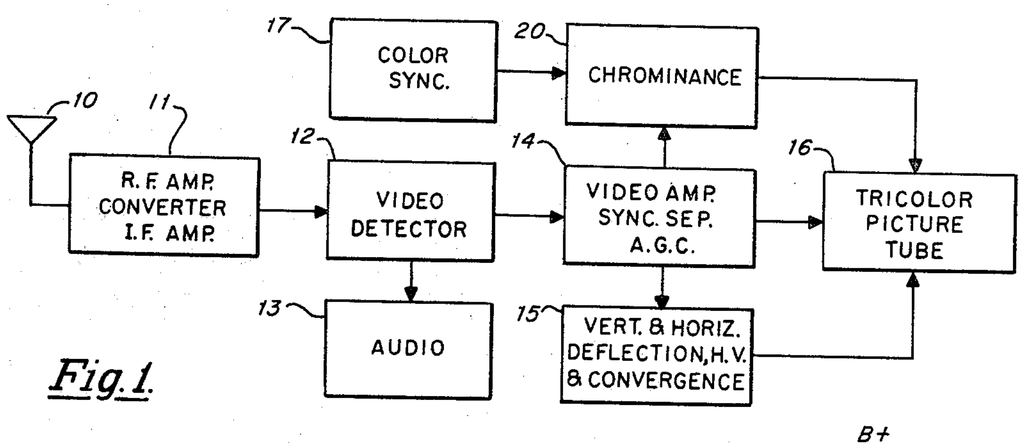

The chrominance channel of a color television receiver generally includes one or more stages of bandpass amplifying circuitry for amplifying the received chroma signal, a chroma demodulator for converting the received chroma signal into two demodulated signals containing color difference information, and matrixing circuitry for developing the required three color difference signals. Color difference signal amplifiers may also be included, depending upon the type of chroma demodulator employed. Basically, two different types of chroma demodulators are employed, high level demodulators and low level demodulators. High level demodulators are termed such because they provide sufficient gain in themselves so that separate amplification of the color difference signals is not required. Low level demodulators, however, do require a separate amplifying stage for each of the color difference signals.

The color difference amplifying circuitry associated with low level demodulators is usually integrated with the matrixing arrangement for producing the third color difference signal. The color difference amplifiers usually comprise an electron tube and associated circuitry for each color difference signal, and the matrixing may be accomplished by anode matrixing or a combination of anode and cathode matrixing. Typically, the two signal outputs of the low level chroma demodulator are called the —X and —Z signals. If anode matrixing alone is used, the —X and —Y signals are usually the —(*R–Y*) and —(*B–Y*) signals, respectively. These two signals are coupled to the control electrodes of the respective (*R–Y*) and (*B–Y*) tubes so that an amplified version of the (*R–Y*) and (*B–Y*) signals appear on the anodes of these tubes. A resistive network incorporating a resistance ratio of the proper amount couples the anodes of the (*R–Y*) and (*B–Y*) tubes to the control electrode of the (*G–Y*) tube. It is well-known that addition of the —(*R–Y*) and —(*B–Y*) signals in the proper ratio produces the required (*G–Y*) signal. Thus the combined (*R–Y*) and (*B–Y*) signals on the control electrode of the (*G–Y*) tube produce an amplified (*G–Y*) signal on the anode of this tube.

When cathode matrixing is employed, the —X and —Z signals each contain both (*R–Y*) and (*B–Y*) information in the appropriate form. The respective cathodes of the three color difference tubes are directly connected to a common terminal which in turn is connected through a resistor to a source of ground reference potential. With this arrangement, the —X and —Z signals present on the control grids and cathodes of the (*R–Y*) and (*B–Y*) tubes are added in the common cathode resistor. Therefore, this combined signal is also available at the cathode circuit of the (*G–Y*) tube. Since the ratio of —(*R–Y*) and —(*B–Y*) signals required to produce the (*G–Y*) signal cannot be obtained solely through matrixing in a common cathode resistor, a certain amount of (*R–Y*) signal must be fed to the control grid of the (*G–Y*) tube from the anode of the (*R–Y*) tube.

With color difference amplifying circuitry embodying cathode matrixing, it is known to provide a combination function of "horizontal retrace blanking" and "key clamping" during the horizontal retrace period. It will be appreciated that, by providing a sufficiently large negative pulse on the common cathodes of the color difference tubes, an amplified version of that negative pulse will appear on each of the anodes of the tubes. These large negative pulses may be capacitively coupled to the G1 electrodes in the color picture tube to provide effective blanking therein. At the same time, the negative pulse supplied to the common cathode terminal may be used to reset the level of the DC voltage on the control grids of the color difference tubes to the proper value during each horizontal retrace period. This operation is what is termed "key clamping," and it will be discussed in greater detail below.

It is the object of this invention to provide an improved color television circuit for accomplishing the functions of horizontal retrace blanking of a color television picture tube and key clamping in a plurality of color difference amplifiers.

More particularly, it is the object of this invention to provide a transistor blanking circuit for developing a nearly ideal horizontal retrace blanking and key clamping pulse on the common cathode terminal of a plurality of color difference amplifiers.

In accordance with this invention, a transistor is provided having its output electrode directly connected to the common cathode terminal of a plurality of color difference amplifiers, its common electrode directly connected to a source of either ground reference potential or an appropriate negative potential, and its input electrode coupled to a triggering pulse source which may comprise a winding on the horizontal output transformer of the color television receiver. The triggering pulse applied to the input electrode of the transistor during each horizontal retrace interval is of sufficient magnitude to turn on the transistor and place it in a saturated condition so that the potential on the common electrode effectively appears on the output electrode and thus on the common cathode terminal of the color difference amplifiers. During normal signal intervals, the common cathode terminal has a potential of six or seven volts thereon due to the cathode currents of the color difference amplifiers. With the output electrode of the transistor directly connected to the common cathode terminal, the DC voltage on the common cathode terminal provides the required initial operating bias for the output electrode so that no separate bias supply is required for the output electrode of the transistor. As the triggering pulse turns on the transistor to saturation, the voltage on the common cathode terminal drops rapidly to the potential on the common electrode and remains there until the triggering pulse disappears and the transistor turns off. The voltage on the common terminal then rises rapidly to its normal DC level, and consequently a sharp, square negative pulse is developed on the common cathode terminal. This sharp, square pulse provides a nearly ideal condition for purposes of blanking and key clamping.

Figure 2:
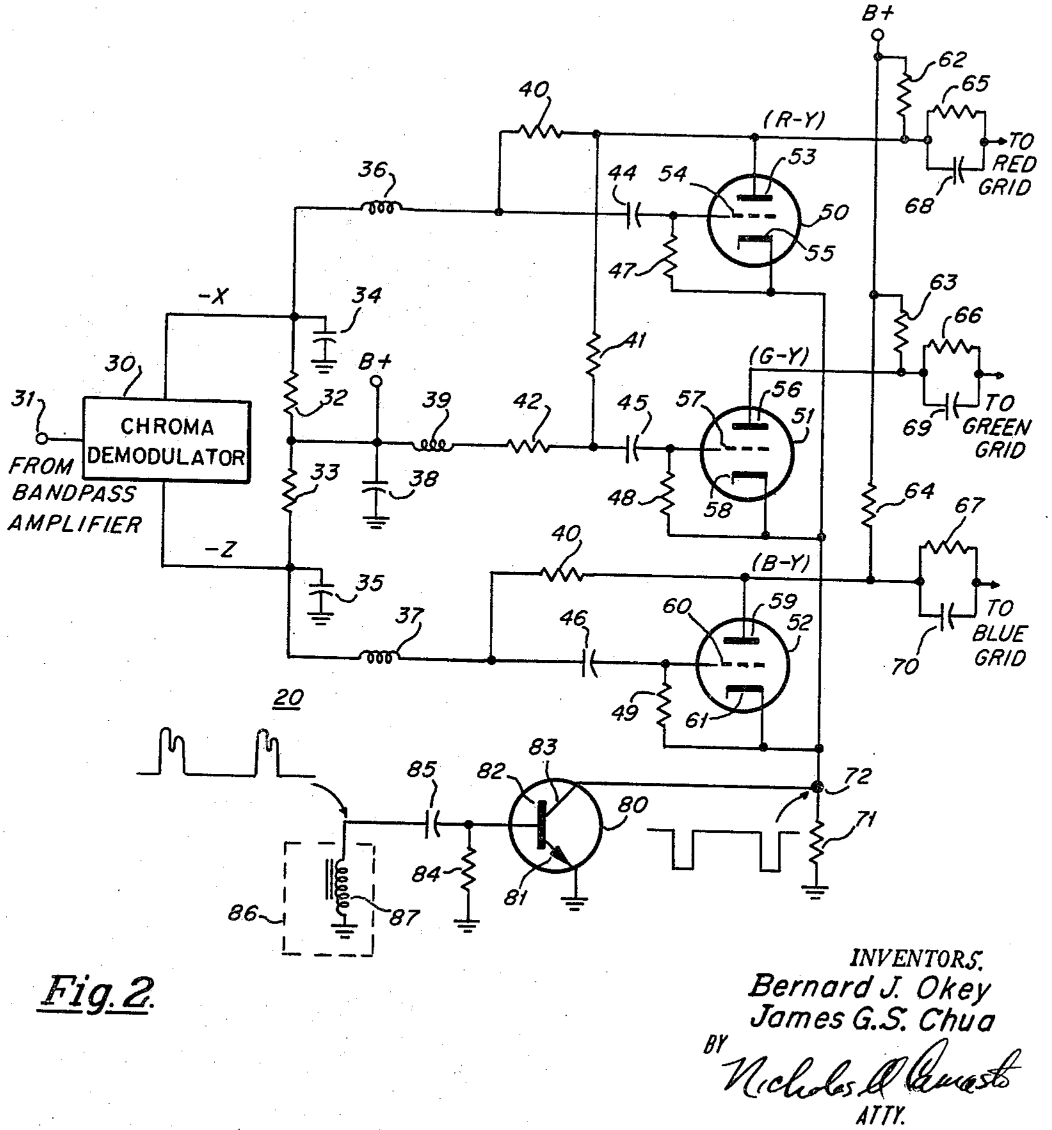

With the improved color television circuit of this invention, therefore, an inexpensive, nearly idealized transistor blanking circuit is provided. Other objects, features, and advantages of this invention will become apparent from a consideration of the following description in conjunction with the accompanying drawing in which:

FIG. 1 is a simplified block schematic diagram of a color television receiver; and FIG. 2 is a circuit schematic diagram of a portion of the color television receiver of FIG. 1 including circuitry embodying this invention.

Referring now to FIG. 1, an antenna 10 picks up a transmitted television signal and couples it to block 11 which may contain a RF amplifier, a converter, and an IF amplifier. The RF amplifier amplifies the received television signal, the converter changes the received RF signal to an IF signal, and the IF amplifier amplifies the converted IF signal. This amplified IF signal is then coupled into block 12 which may contain a video detector. Video detector 12 converts the IF signal into a composite signal containing synchronizing and video information portions. The audio information is separated off and coupled to block 13 which may contain the necessary audio circuits for reproducing the sound portion of the television program.

The video information portion and the synchronizing signal portion of the composite signal are coupled into block 14 which may contain a video amplifier, a sync separator, and AGC circuitry. The sync separator circuitry in block 14 separates the synchronizing signal portion from the composite signal and couple it to block 15 which may contain vertical and horizontal deflection circuitry, high voltage circuitry, and convergence circuitry. These various circuits in block 15 are coupled to block 16 which may comprise a tricolor picture tube and its associated deflection coil and convergence equipment.

The AGC circuitry within block 14 functions to detect the level of the video signal portion and to develop a DC control voltage for varying the gain of the RF amplifier and IF amplifier in accordance therewith.

Also within block 14 the luminance information is separated from the chrominance information in the video signal, and the luminance information is separately amplified by one or more video amplifier stages and then coupled to tricolor picture tube 16. The chrominance information from block 14 is coupled into block 20 which may contain the chrominance circuitry, including a chroma bandpass amplifier, a chroma demodulator, and various related circuitry. The chrominance circuitry in block 20 functions under the control of color sync circuitry in block 17. The color sync circuitry 17 and chrominance circuitry 20 serve to amplify and demodulate the chroma signal, which is then applied in an appropriate manner to tricolor picture tube 16. The preceding description is considerably simplified since the details of the operation of color television receivers are well-known.

In FIG. 2 an example of a portion of the circuitry contained in block 20 in FIG. 1 is shown, including a preferred embodiment of the circuit of this invention. As shown in FIG. 2, the chrominance circuitry 20 includes a chroma demodulator 30 which has an input terminal 31 receiving the amplified chroma signal from the proceeding chroma bandpass amplifier (not shown). Chroma demodulator 30 has two outputs labeled —X and —Z. Resistors 32 and 33 couple the —X and —Z leads respectively to a source of B+ potential. Capacitors 34 and 35 couple these same two leads to a source of ground reference potential, and capacitor 38 couples the junction point of resistors 32 and 33 to a source of ground reference potential. Inductor 36 and capacitor 44 are connected in series between the —X lead and control electrode 54 of electron tube 50. similarly, inductor 37 and capacitor 46 are connected in series between the —Z lead and control electrode 60 of electron tube 52. Inductor 39, resistor 42, and capacitor 45 are connected in series between a source of B+ potential and control electrode 57 of electron tube 51. Resistors 40 and 43 are connected between anode 53 of tube 50 and anode 59 of tube 52, respectively, and the junctions of inductor 36 and capacitor 44 and inductor 37 and capacitor 46. Resistors 47, 48, and 49 are respectively connected between control electrode 54 and cathode 55 of tube 50, control electrode 57 and cathode 58 of tube 51, and control electrode 60 and cathode 61 of tube 52. Cathodes 55, 58, and 61 are directly connected to common terminal 72; and common terminal 72 is connected by way of resistor 71 to a source of ground reference potential. Resistors 62, 63, and 64 connect anodes 53, 56, and 59 respectively, to a source of B+ potential. Resistor 41 also connects anode 53 of tube 50 to the junction of resistor 42 and capacitor 45. The parallel combinations of resistors 65, 66, and 67 and capacitors 68, 69, and 70 couple anodes 53, 56, and 59 to the red, green, and blue grids of the tricolor picture tube (not shown).

A transistor 80, which is a NPN type transistor, has an emitter 81, a base 82, and a collector 83. Collector 83 of transistor 80 is directly connected to common terminal 72. Emitter 81 of transistor 80 is directly connected to a source of ground reference potential. Resistor 84 connects base 82 of transistor 80 to a source of ground reference potential, and capacitor 85 couples base 82 to block 86 which may contain a horizontal output transformer having a winding 87 thereon. Horizontal output transformer 86 will actually be part of the vertical and horizontal deflection circuitry in block 15 of FIG. 1.

Chroma demodulator 30 functions to develop the two signals —X and —Z. These signals are developed across load resistors 32 and 33, respectively, and are then coupled to control electrodes 54 and 60 of tubes 50 and 52, respectively. As a result of the cathode matrixing, an amplified version of the $(R-Y)$ signal appears on anode 53 of tube 50, and an amplified version $(B-Y)$ appears on anode 59 of tube 52. At the same time, a —X signal and a —Z signal appear on cathodes 55 and 61 of tubes 50 and 52, respectively; and these two signals are mixed in resistor 71. The sum of the —X and —Z signals developed across resistor 71 is coupled into cathode 58 of tube 51. At the same time resistor 41 couples a predetermined amount of $(R-Y)$ signal from anode 53 of tube 50 to control electrode 57 of tube 51. The signal developed across resistor 71 and the $(R-Y)$ signal developed on control electrode 57 are both amplified by electron tube 51, and the resultant signal on anode 56 of tube 51 is an amplified version of an additive signal containing $-(R-Y)$ and $-(B-Y)$ signal information in a predetermined proportion. As is well-known, the addition of proper portions of $-(R-Y)$ and $-(B-Y)$ signal information produces a $(G-Y)$ signal, which is the third color difference signal required by the tricolor picture tube. These three color difference signals appearing on anodes 53, 56, and 59 are then coupled to the red, green, and blue grids, respectively, in the tricolor picture tube. This signal information, together with the luminance or Y signal information available on the cathodes of the tricolor picture tube, function to produce the required potential differences between the respective G1 grids and the cathodes so that a proper color picture is reproduced on the screen of the color television picture tube.

During horizontal retrace intervals, it is desirable to perform an operation on the color television picture tube which is known as horizontal retrace blanking. At the same time it is desirable to provide key clamping in the color difference amplifier. As shown, winding 87 on horizontal output transformer 86 couples a positive pulse through capacitor 85 to base 82 of transistor 80 during each horizontal retrace interval. Due to the ringing which occurs in the horizontal output transformer, the positive pulses provided by winding 87 are rounded and irregular in the manner depicted in the drawing. As a particular one of these pulses appears on base 82 of transistor 80, transistor 80 is turned on, and the magnitude of the pulse is sufficient to cause transistor 80 to saturate quickly. As transistor 80 saturates, the ground reference potential on emitter 81 appears on collector 83, and therefore, also on common terminal 72. Common terminal 72, during normal signal intervals has a voltage of approximately six or seven volts DC thereon. This DC voltage provides the necessary operating bias for collector 83 of transistor 80 so that no separate power supply is required for this transistor. As transistor 80 saturates and the voltage on common terminal 72 drops rapidly to ground reference potential, a negative pulse is thereby produced. Transistor 80 turns off as each triggering pulse ceases so that the voltage on common terminal 72 rapidly rises to its normal level. In this manner sharp, square, negative pulses are developed on common terminal 72 during each horizontal retrace interval.

The negative pulses appearing on common terminal 72 are coupled to cathodes 55, 58, and 61, and are thus amplified in tubes 50, 51, and 52. The large negative pulses which result on anodes 53, 56, and 59 are capacitively coupled to the red, green, and blue grids of the picture tube, thereby cutting off the flow of electrons from the cathodes of the picture tube. In this manner horizontal retrace blanking is effectively and efficiently accomplished.

At the same time, however, the presence of these sharp, square, negative pulses on common terminal 72 create a nearly ideal condition for key clamping in the color difference amplifiers. As each negative pulse arrives on common terminal 72, the respective cathodes 55, 58, and 61 of tubes 50, 51, and 52 become negative with respect to the DC voltage at control electrodes 54, 57, and 60 which is due to the charge on capacitors 44, 45, and 46.

As a result, a charging path with a relatively small RC time constant is provided for each of the capacitors 44, 45, and 46. This charging path for capacitor 46, for example, is the series path from B+ potential through resistor 33, inductor 37, capacitor 46, the forward biased grid-cathode diode of tube 52, and resistor 71 to ground reference potential. Similar paths exist for capacitors 45 and 46 and the small time constants are due to the relatively low values of resistors 32, 33, 42, and 71. Thus, during the horizontal retrace interval, a relatively large amount of cathode-grid current will flow and capacitors 44, 45, and 46 will be charged up to voltages which are negative with respect to the cathodes. As the negative pulse on common terminal 72 disappears, the negative charge on the capacitors will begin to leak off. However this leakage takes place very slowly because the relatively large values of resistors 47, 48, and 49 provides a relatively large RC time constant for the discharging path.

As is well-known key clamping provides automatically for adjustment of the relative DC voltages on control electrodes 54, 57, and 60 when the aging characteristics of tubes 50, 51, and 52 are different because the amount of grid-cathode current is directly proportional to the available cathode emission. The sharp, square, negative pulses developed by the transistorized blanking circuitry provide nearly ideal conditions for accomplishing this key clamping because the cathodes of the color difference amplifiers are maintained at substantially ground reference potential throughout the horizontal retrace interval so that an even flow of cathode-grid current is produced for charging the capacitor in the grid circuit.

From the preceding description, it will be appreciated that the transistor blanking circuit of this invention provides an inexpensive, efficient horizontal retrace blanking function for the color picture tube and a nearly ideal key clamping function for the color difference amplifiers.

The embodiments of the invention in which an exclusive property or privilege is claimed are defined as follows:

1. In combination in a color television receiver: a plurality of electron tubes each including a cathode, an anode, and a control electrode, said cathodes being connected to a common terminal; resistive means coupling said common terminal to a source of reference potential; means applying a plurality of color difference signals between said control electrodes and said cathodes; a plurality of load impedances coupled to said anodes; and transistor blanking means direct current connected to said common terminal, said transistor blanking means including a single transistor having an input circuit responsive to a control signal and an output circuit connected across said resistive means, for applying a negative pulse thereto during each horizontal retrace interval.

2. The combination as claimed in claim 1, wherein said single transistor has common, output, and control electrodes, said common electrode being directly connected to said source of reference potential, and said output electrode being directly connected to said common terminal; and circuit means applying a control signal to said input electrode to turn said transistor ON at the start of each horizontal retrace interval and to turn said transistor OFF at the end of each horizontal retrace interval.

3. The combination as claimed in claim 2, wherein said single transistor is an NPN type transistor and said common, output, and control electrodes are, respectively, the emitter, collector, and base electrodes of said NPN type transistor; and said circuit means includes a horizontal output transformer having a pulse winding thereon and a capacitor coupling said winding to said base electrode to apply a positive pulse thereto during each horizontal retrace interval.

4. The combination as claimed in claim 3, wherein the magnitude of said positive pulse is sufficient to saturate said transistor, whereby said common terminal is provided with substantially said reference potential during each horizontal retrace interval.

5. The combination as claimed in claim 2, wherein said common terminal has a DC voltage thereon during normal signal intervals to provide a bias voltage on said output electrode of said transistor for initial turning ON of said transistor at the beginning of each horizontal retrace interval, whereby a separate power supply for said transistor is not required.

References Cited

UNITED STATES PATENTS 3,446,915 5/1969 Voige ---------------- 178—7.5

OTHER REFERENCES

RCA Schematic File: 1965, T12, Chassis CTC 17X Series, pp. 31–33, copyright 1965.

ROBERT L. GRIFFIN, Primary Examiner

ROBERT L. RICHARDSON, Assistant Examiner

U.S. Cl. X.R.

178—7.5; 315—22